US008080103B2

(12) United States Patent
Venon et al.

(10) Patent No.: US 8,080,103 B2
(45) Date of Patent: Dec. 20, 2011

(54) DEMOULDING COMPOSITION

(75) Inventors: Stéphane Venon, Décines (FR); Gilles Chanvillard, Les Cavetières (FR); Isabelle Dubois-Brugger, Chassieu (FR); Christophe Levy, Saint Marcel bel Accueil (FR); Vincent Teissier, La Tour du Pin (FR)

(73) Assignee: Lafarge, Paris (FR)

( * ) Notice: Subject to any disclaimer, the term of this patent is extended or adjusted under 35 U.S.C. 154(b) by 411 days.

(21) Appl. No.: 12/519,804

(22) PCT Filed: Dec. 14, 2007

(86) PCT No.: PCT/FR2007/002071

§ 371 (c)(1),
(2), (4) Date: Jun. 18, 2009

(87) PCT Pub. No.: WO2008/087298

PCT Pub. Date: Jul. 24, 2008

(65) Prior Publication Data

US 2010/0107928 A1 May 6, 2010

(30) Foreign Application Priority Data

Dec. 18, 2006 (FR) .................................... 06 11035

(51) Int. Cl.

| | |
|---|---|
| ***C09D 5/00*** | (2006.01) |
| ***C09D 191/00*** | (2006.01) |
| ***B28B 7/36*** | (2006.01) |

(52) U.S. Cl. .................. 106/38.22; 106/38.24; 264/338

(58) Field of Classification Search ............... 106/38.22, 106/38.24; 264/338
See application file for complete search history.

(56) References Cited

U.S. PATENT DOCUMENTS

| | | | | |
|---|---|---|---|---|
| 4,028,120 | A | 6/1977 | Emond | |
| 5,709,739 | A * | 1/1998 | Wittich et al. ............. | 106/38.22 |
| 6,902,606 | B1 * | 6/2005 | Davies .............................. | 106/2 |

FOREIGN PATENT DOCUMENTS

| | | |
|---|---|---|
| EP | 1 721 718 | 11/2006 |
| WO | WO 02/26458 | 4/2002 |

* cited by examiner

*Primary Examiner* — David M Brunsman
(74) *Attorney, Agent, or Firm* — Pillsbury Winthrop Shaw Pittman, LLP

(57) ABSTRACT

A demolding composition, to be used for the production of parts of hydraulic-setting material, includes at least one oil and at least one calcium salt, calcium borates and calcium salts of fatty acids being excluded from the at least one calcium salt. A process for the preparation of a part molded in hydraulic-setting material, includes coating sides of an appropriate mold with the demolding composition; introducing a freshly-prepared hydraulic-setting composition; and removing the part from the mold after hardening and optional curing of the composition.

15 Claims, 1 Drawing Sheet

DEMOULDING COMPOSITION

CROSS-REFERENCE TO RELATED APPLICATIONS

This is the U.S. National Stage of PCT/FR2007/002071, filed Dec. 14, 2007, which in turn claims priority to French Patent Application No. 0611035, filed Dec. 18, 2006, the entire contents of both applications are incorporated herein by reference in their entireties.

FIELD

The invention relates to a demoulding composition, useful, in particular, for the production of moulded parts in hydraulic-setting material such as concrete.

BACKGROUND

When producing parts by moulding, it is important to control the demoulding step in order to obtain an intact and homogeneous surface and reduce non-conformities. In particular, hydraulic-setting compositions such as concrete tend to react with the surface of the mould. These reactions tend to lower the quality of the moulded part and the service life of the mould.

In order to resolve this problem, it is known to coat the mould with a formwork removal or demoulding composition. For the demoulding of parts of hydraulic-setting materials, one may use demoulding oils. The film of oil thus disposed on the sides of the mould makes it possible to avoid direct contact between the hydraulic-setting compositions and the surface of the mould, hence protecting the aforesaid surface of the mould.

However, known demoulding oils still have certain disadvantages. In particular, it remains difficult to obtain parts with a homogenous surface appearance. One may in particular observe the appearance of little bubbles on the surface and colour inhomogeneities, as for example whitish streaks or dark rings.

It therefore remains difficult to obtain moulded parts with a sufficiently homogeneous appearance and colour for certain applications, as for example, uncovered linings after formwork removal.

SUMMARY

The aim of this invention is therefore to provide a demoulding composition for parts moulded in hydraulic-setting material making it possible to obtain a moulded part with a homogeneous surface appearance. Its aim is equally to provide a demoulding composition not presenting one or more of the mentioned disadvantages. Finally it aims at providing a demoulding composition conferring a water-repellent or coloured character to the moulded part.

In order to facilitate its application, the demoulding composition preferably further meets the following requirements:

- a viscosity allowing for example application by spraying;
- a good spread on the surface of the mould; and
- sufficient stability for storage before use.

The invention is based on the surprising finding that the introduction of a calcium salt into a demoulding oil improves the surface appearance of the moulded parts and at the same time retains the demoulding qualities.

Without wishing to be bound by any theory, it is considered that the demoulding difficulties are partly due to the heterogeneous kinetics of the formation of hydrates during hydration of the surface. The presence of calcium salts allows, by its accelerating action, for the creation of a great quantity of seeds, thus making it possible to reduce substantially these heterogeneities.

On this basis, the action of the calcium salts is distinguished from those of other products, such as reactive powders, like silica or certain polymers called organic super absorbents.

Hence, the invention provides, according to an initial aspect a demoulding composition, to be used for the production of parts of hydraulic-setting material, comprising at least one oil and at least one calcium salt, the calcium borates and calcium salts of fatty acids being excluded from the calcium salts according to the invention.

Preferably, the oil is an oil of vegetable or animal origin.

More preferably it is a composition in which the oil comprises one or more compounds selected from the fatty acid esters, and in particular the triglyceride fatty acids and the neopentylpolyol esters of fatty acids.

The calcium salt is preferably selected from calcium chloride, bromide, nitrite and thiocyanate.

Advantageously, the composition comprises 0.1 to 70 weight % of calcium salt. The composition may in particular be formulated in the form of a solution, an emulsion or a suspension.

The demoulding composition may further comprise one or more compounds selected from a stabilizer, a dispersant, a surfactant, a preservative, a solvent, a thickening agent and a thixotropic agent, in particular one or more compounds selected from a water-repellent agent and a pigment.

It may comprise as a water-repellent agent, in particular products based on silicone, on silane, on siloxane or metallic salts of fatty acids.

It may in particular comprise as a pigment one or more inorganic oxides or hydroxides and most particularly one or more pigments selected from titanium dioxide, iron, cobalt or chromium oxides.

According to another aspect, the invention provides a process for the preparation of moulded parts in hydraulic-setting material, comprising the step of:

- coating the sides of an appropriate mould with the composition according to the invention;
- introducing the freshly-prepared hydraulic-setting composition; and
- removing the part from the mould after hardening and optional curing of the composition. Preferably, the coating of the mould is done by spraying.

According to a third aspect, the invention provides a moulded part obtainable by the above process, in particular in which the hydraulic-setting composition is a composition based on cement, in particular a concrete.

DETAILED DESCRIPTION

Figure 1:
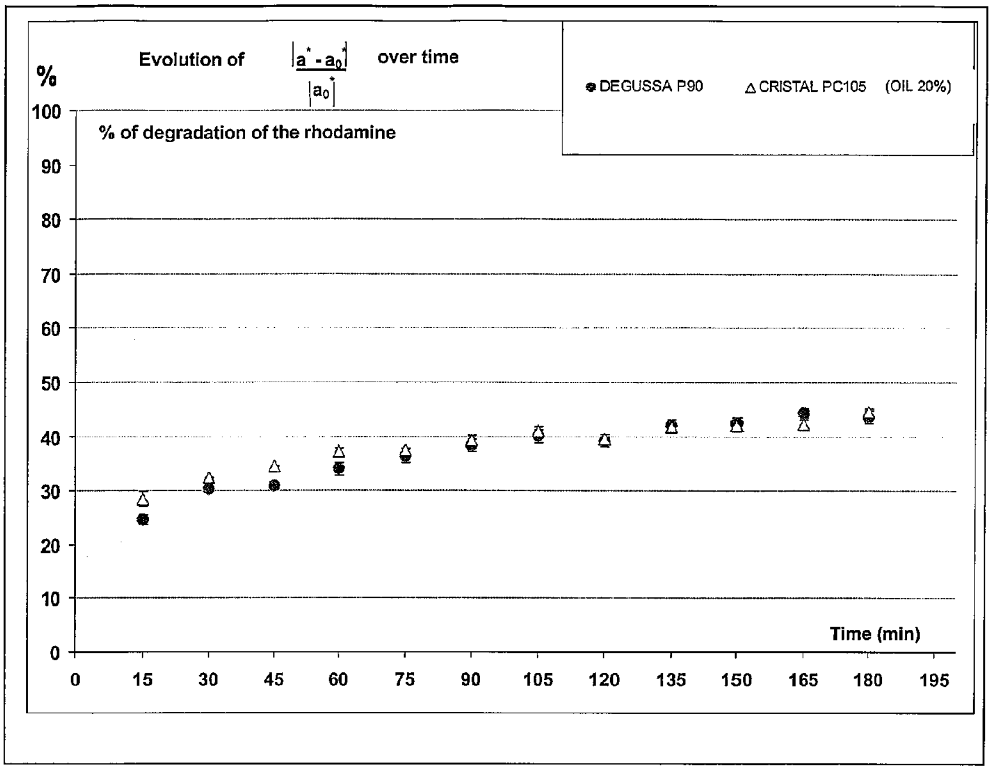
FIG. 1 shows the evolution of the percentage of degradation of the red colouration over time for two types of $TiO_2$

The demoulding composition according to the invention comprises at least one calcium salt.

«Calcium salt» is understood to cover the compounds comprising at least one calcium ion and at least one inorganic or organic counter-ion. Particularly envisaged are the calcium halides such as chloride, bromide; calcium thiocyanate, calcium hydroxide, salts of nitrogen-containing-ions such as calcium nitrate, nitrite or nitride, salts of sulphur-containing ions such as calcium sulfate, sulfite, bisulfite, or even carboxylic or hydroxycarboxylic acid salts such as the lactates. Among these salts, calcium chloride, bromide, nitrite and thiocyanate are preferred, and in particular calcium nitrite. Calcium borates, as well as calcium salts of fatty acids, are excluded from this definition The concentration of calcium salt may vary greatly depending on the formulation without notably affecting the result.

Generally, a low concentration of calcium salts, about 0.1 weight % relative to the weight of the demoulding composition, is sufficient to improve the surface appearance of the moulded parts. The upper limit of the concentration of calcium salt is essentially dictated, according to the selected formulation, by its solubility and/or economic considerations, it being understood that generally no further improvement is observed above a concentration of about 70 weight % of calcium salt relative to the final demoulding composition. Hence, the composition will generally contain 0.1 to 70 weight % of anhydrous calcium salt.

The demoulding composition according to the invention further comprises at least one oil. In order to optimize its properties, the composition comprises as a general rule a mixture of different oils.

The term «oil» is understood as an essentially hydrocarbon material liquid at ambient temperature and not miscible with water.

The oils make it possible to reduce the friction coefficient and hence facilitate the demoulding. Among these oils, one in particular distinguishes the mineral, animal and vegetable oils. In the composition according to the invention, all the oils may in principle be used.

However, animal or vegetable oils are preferred. Indeed, they are more polar and one observes that the moulded parts present a more homogenous surface appearance, in particular a decrease in the appearance of bubbles. Furthermore, mineral oils are submitted to strict regulations in terms of their waste disposal.

Vegetable oils are more particularly preferred. Indeed, these contain functions that are likely to be saponified in an alkaline medium to produce an alcohol and calcium acid salt, and thus permit a good transfer of additives to the surface of the hydraulic-setting part.

Oils of vegetable origin are particularly preferred comprising a high proportion of esters, such as fatty acid triglycerides, fatty acid esters or complex esters such as neopentylpolyol esters of fatty acids.

Vegetable demoulding oils available on the market are more particularly preferred, such as Rheofinish 201 of Degussa, Decobio VGI 200 of Pieri or Chryso® Dem Eco 2 of Chryso.

The composition may be formulated in single phase, diphasic or even multiphasic form. It may in particular come in the form of a solution, of a simple or complex emulsion, of a gel, or even of a suspension.

Depending on the selected formulations, the composition may further comprise one or more formulation admixtures, in particular such as stabilizers, dispersants, surfactants, preservatives, solvents, thickening agents and thixotropic agents According to an embodiment of the invention, the demoulding composition further comprises water-repellent agents and/or pigments to improve the surface properties and appearance of the moulded parts.

Among the water-repellent agents, one may mention solid or liquid products based on silicone (e.g. Masterseal 530 of Degussa, Aerosil R972 of Degussa), products based on silane and/or siloxane (e.g. Rheomix 791 of Degussa, Silicone Z6688 of Dow Corning), or even metallic salts of fatty acids.

Among the pigments, one may mention in particular inorganic pigments, such as, in particular, the oxides or hydroxides of such metals as iron, chromium, titanium, cobalt, aluminium or manganese, their mixtures and mixed compounds, as well as carbon black. Titanium dioxide and/or oxides of iron, cobalt or chromium will preferably be used. These inorganic pigments and their mixtures are known as such and in particular commercialized by Chryso, France. The calcium salts further allow one to render the mineral pigments compatible with the surface.

Titanium dioxide, by virtue of its photocatalytic properties, may equally be used as a de-polluting agent.

The hydraulic-setting material may also be tinted using organic pigments such as, for example, catechol or bromothymol blue.

However, inorganic pigments are preferred.

These pigments may be added in variable quantities, but generally within the range of 2 to 70%, preferably 5 to 40 weight % relative to the final composition.

The demoulding composition is in principle simple to produce.

The calcium salt being understood as generally not very soluble in oil, it is preferably introduced in the form of a solution, in particular an aqueous solution.

The two phases may be mixed in a manner known per se, for example in an appropriate mixer, and a more or less stable emulsion is obtained. Depending on the respective proportions of the two phases, the oily phase constitutes the continuous phase (W/O) or the dispersed phase (O/W emulsion). In certain cases, this may result in different formulations such as gels.

The formulations in the form of an emulsion are preferably unstable under shear. Indeed, one observes that the rapid separation of the phases being applied leads to a drop of the viscosity, which facilitates a homogenous application.

It is generally possible to envisage the direct introduction of calcium salts in a solid form, with or without a solvent, for example in the context of a formulation in suspension. In this case, it is generally preferred that the salt be finely divided.

According to another aspect, the invention provides a process for the preparation of moulded parts of a hydraulic-setting material, comprising the step of:

coating the sides of an appropriate mould with the described composition;

introducing the freshly-prepared hydraulic-setting composition; and removing the part from the mould after hardening and optional curing of the composition.

The coating of the mould with the demoulding composition may be done in a manner known per se, for example by application with a brush, with a cloth rag, or roller, by dipping or even by spraying, this last application mode being preferred.

The quantity of the composition to be applied is selected so as to be sufficient to form a continuous film on the entire surface of the mould that will be put in contact with the hydraulic-setting composition. The thickness of the film of formed oil is generally within the range of 1 to 15 micrometers.

Hence the quantity of composition depends on its viscosity and thus its formulation. The material and the topology of the mould may also be factors to consider.

By way of example, it is generally sufficient to apply 5 to 15 $g/m^2$ of a composition with a viscosity of approximately 50 mPa·s on a metallic mould. The amount applied will be greater in absorbent moulds, for example, of wood, or for a formulation with a higher viscosity.

The demoulding composition is effective on moulds of different materials. One may in particular mention metallic moulds, moulds of wood, of bakelised wood or even of polymers.

The term «hydraulic-setting composition» is understood as designating mineral compositions for which the setting is conditioned by the addition of water, such as compositions based on cement and preferably Portland cement, as for example mortars or concretes.

The parts moulded with moulds treated in this way are simple to demould and present homogenous surface appearances. In particular, one observes:

a homogenous tint;

a more durable colouration;

fewer visible surface bubbles; and the possibility of conferring water-repelling properties.

The utilisation of the described composition thus provides access to moulded parts with an aesthetic aspect compatible for an exacting application, for example for non-covered linings after formwork removal.

Therefore, the invention provides, according to another aspect, parts moulded with a hydraulic-setting composition, in particular a cement composition such as concrete, obtainable by use of the described composition.

The invention will be described in more detail in the following Examples.

EXAMPLES

Unless otherwise specified in the following, all the percentages are understood to be percentages by weight relative to the weight of the final composition.

Example 1

Demoulding Composition

In an appropriate receptacle are introduced 30 parts by weight of vegetable demoulding oil (CHRYSO® Dem ECO 2) then 70 parts by weight are poured of an aqueous solution of calcium chloride (75 g/L). The two phases are mixed with an Ultra-Turrax mixer and an emulsion is obtained whose stability is reduced.

Example 2

Demoulding Composition

In an appropriate receptacle are introduced 30 parts by weight of vegetable demoulding oil (CHRYSO® Dem ECO2) then 70 parts by weight are poured of an aqueous solution of calcium thiocyanate (138.9 g/l). The two phases are mixed with an Ultra-Turrax mixer and a gel is obtained which dephases in one hour.

Example 3

Water-Repelling Demoulding Composition

In an appropriate receptacle are introduced 30 parts by weight of vegetable demoulding oil (CHRYSO® Dem ECO2) then 35 parts by weight are poured of an aqueous solution of calcium chloride (at 75 g/L) and 35 parts by weight of an anti-efflorescence, water-repelling agent (Rheomix 791 of Degussa). The three phases are mixed with an Ultra-Turrax mixer and a mixture stable for several hours is obtained.

Example 4

Pigmented Demoulding Composition

In an appropriate receptacle are introduced 50 parts by weight of vegetable demoulding oil (CHRYSO® Dem ECO2) then 14.20 parts by weight are introduced of calcium chloride, 12.28 parts by weight of iron oxide (Bayferrox 110 of Bayer) and 4.17 parts by weight of a dispersant (CHRYSO® Fluid Premia 180) and 19.35 parts by weight of distilled water. The phases are mixed with an Ultra-Turrax mixer and a mixture stable for several hours is obtained.

Example 5

Pigmented Demoulding Composition

In an appropriate receptacle are introduced 50 parts by weight of vegetable demoulding oil (CHRYSO® Dem ECO2) then 10.77 parts by weight are introduced of calcium chloride, 24.56 parts by weight of $TiO_2$ (Aeroxide P25 of Degussa) and 14.67 parts by weight of distilled water. The phases are mixed with an Ultra-Turrax mixer and a mixture stable for several hours is obtained.

Example 6

Water-Repelling and Pigmented Demoulding Composition

In an appropriate receptacle are introduced 50 parts by weight of vegetable demoulding oil (CHRYSO® Dem ECO2) then 16 parts by weight are introduced of calcium chloride, 12 parts by weight of $TiO_2$ (Aeroxide P25 of Degussa) and finally 22 parts by weight of an emulsion of an anti-efflorescence, water-repelling agent (Rheomix 791 of Degussa). The phases are mixed with an Ultra-Turrax mixer and a mixture stable for several hours is obtained.

The demoulding behaviour of the compositions prepared according to the examples 1 to 6 were evaluated for mortar compositions in the following manner.

An appropriate quantity of the demoulding composition was applied on metallic moulds using a cloth rag. After drying, a mortar composition prepared using the components given in table 1 was introduced into the mould. The part was then demoulded after hardening of the composition.

TABLE 1

Composition of the test mortar

| Components | Mass [g] |
|---|---|
| Cement from Le Havre | 540.0 |
| Sand from Mondragon | 1350.0 |
| Total water | 297.0 |
| Admixture (Glenium 27 of Degussa) in dry material/weight of the cement | 0.756 |

The efficiency of the demoulding composition was appraised for application facility, demoulding facility, surface appearance of the moulded part, the presence of surface defects and the surface appearance of the mould. The results are summarized in Table 2 below.

The results were compared with those obtained using a control demoulding oil (CHRYSO® Dem ECO2) and evaluated as follows:

(+) better (○) equivalent (−) less good

TABLE 2

| Evaluation of the demoulding compositions | | | | | |
|---|---|---|---|---|---|
| Example | Application | Demoulding | Appearance of the part | Surface defects | Mould appearance |
| 1 | (○) | (+) | (+) | (+) | (+) |
| 2 | (○) | (+) | (+) | (+) | (+) |
| 3 | (○) | (○) | (+) | (+) | (+) |
| 4 | (○) | (+) | (+) | (+) | (○) |
| 5 | (○) | (+) | (+) | (+) | (○) |

An improvement of the surface appearance of the parts is observed and a reduction of surface defects such as surface bubbles in all cases. Furthermore, the parts are seen to present a more homogenous tint.

On the other hand, the application of the demoulding oil remains unchanged relative to a classic oil, and the mortars made are easily demoulded. Finally, the appearance of the mould after demoulding is improved (less dust).

The demoulding behaviour of the compositions prepared according to Examples 1, 3, 5, 6 was evaluated in the same manner as compositions of concrete of the B25 type prepared using components given in Table 3 below.

TABLE 3

| Composition of the test concrete, the B25 type | |
|---|---|
| Components | Mass (Kg/$m^3$) – d = 2.36 |
| Cement from Val d'Azergues CEM I RPMES | 280.0 |
| Betocarb P2 | 120.0 |
| 0/5 mm Saint Bonnet | 755.0 |
| 5/10 mm Saint Bonnet | 310.0 |
| 10/20 mm Saint Bonnet | 690.0 |
| Admixture (CHRYSO ®Fluid Optima 203) in dry material/weight of the cement + Betocarb P2 | 0.48 |
| Total water | 179.9 |

TABLE 4

| Evaluation of the demoulding compositions | | | | | |
|---|---|---|---|---|---|
| Example | Application | Demoulding | Appearance of the part | Surface defects | Mould appearance |
| 1 | (○) | (+) | (+) | (+) | (+) |
| 3 | (○) | (○) | (+) | (+) | (+) |
| 5 | (○) | (+) | (+) | (+) | (○) |
| 6 | (○) | (○) | (+) | (+) | (○) |

An improvement of the surface appearance of the parts is observed in all the cases and a reduction of surface defects such as surface bubbles in all cases.

Finally, the demoulding behaviour of the compositions prepared according to Examples 1, 5, 6 was evaluated in the same manner as compositions of fluid concrete prepared using components given in table 5 below.

TABLE 5

| Composition of the test concrete - fluid concrete type | |
|---|---|
| Components | Mass (Kg/$m^3$) – d = 2.31 |
| Cement from Val d'Azergues CEM I RPMES | 302.0 |
| BL 200 | 201.0 |
| 0/5 mm Saint Bonnet | 877.0 |
| 5/10 mm Saint Bonnet | 700.0 |
| Admixture (Glenium 27 of Degussa) in dry material/weight of the cement + BL 200 | 1.61 |
| Total water | 220.9 |

TABLE 6

| Evaluation of the demoulding compositions | | | | | |
|---|---|---|---|---|---|
| Example | application | demoulding | Appearance of the part | Surface defects | Mould appearance |
| 1 | (○) | (+) | (+) | (+) | (+) |
| 5 | (○) | (+) | (+) | (+) | (○) |
| 6 | (○) | (○) | (+) | (+) | (○) |

An improvement of the surface appearance of the parts is observed in all the cases and a reduction of surface defects such as surface bubbles in all the cases.

To conclude, the demoulding compositions according to the invention make it possible to obtain parts moulded in hydraulic-setting material presenting an improved surface appearance, in particular in terms of the number of surface defects. Furthermore, they preserve the quality of the mould by minimising adhesions.

Finally, the demoulding compositions according to the invention provide the surface of the moulded parts with a colouration and/or stable and homogenous water-repellent properties.

Example 7

Demoulding Photocatalytic Compositions

In an appropriate receptacle are introduced 79 parts by weight of vegetable demoulding oil (CHRYSO® Dem ECO2) then 1 part by weight of calcium thiocyanate, and finally 20 parts by weight of $TiO_2$ (P90 of Degussa or PC105 of Cristal). The phases are mixed with an Ultra-Turrax mixer and a mixture stable for several hours is obtained.

The obtained photocatalytic effect on the surface of the demoulded pastes was evaluated for mortar compositions in the following manner.

An appropriate quantity of the demoulding composition was applied on metallic moulds using a cloth rag. After drying, a mortar composition prepared using components given in Table 1 was introduced into the mould. The part was then demoulded after hardening of the composition and placed for curing at ambient temperature for 18 hours.

An amount of red dye (Rhodamine B of Sigma Aldrich) approximately 1 g was applied using a dropper onto the surface of the mortar in various locations. The application zones of the dye were circled with a felt pen. Curing was done for 3 hours in a «dark room» to avoid the influence of UVs and to allow the dye to dry.

To determine the photocatalytic effect, the parts were submitted to UV radiation, while spectrocolorimetric monitoring, according to the L*.a*.b*., system of the parameter a* (red indicator) over time was done on the polluted zones.

The results are gathered in FIG. 1, which represents the evolution of the percentage of degradation of the red colouration over time, for two types of TiO2. The full circles correspond to the demoulding oil comprising P90 of Degussa, and the triangles to the demoulding oil comprising P105 of Cristal.

According to FIG. 1, the utilisation of photocatalytic demoulding oils makes it possible to obtain a degradation of the colouration greater than 40% after 3 hours of UV radiation. For a control without TiO2 in the demoulding oil, the degradation is non-existent.

The invention claimed is:

1. A demoulding composition, to be used for the production of parts of hydraulic-setting material, comprising at least one oil and at least one calcium salt, calcium borates and calcium salts of fatty acids being excluded from the at least one calcium salt.

2. The composition according to claim 1, wherein the oil is an oil of vegetable or animal origin.

3. The composition according to claim 2, wherein the oil comprises compounds selected from the esters of fatty acids, and in particular triglycerides of fatty acids and neopentylpolyol esters of fatty acids.

4. The composition according to claim 1, wherein the at least one calcium salt is selected from the group consisting of calcium chloride, bromide, nitrite and thiocyanate.

5. The composition according to claim 1, comprising 0.1 to 70 weight % of calcium salt.

6. The composition according to claim 1, formulated in the form of a solution, an emulsion, a gel or a suspension.

7. The composition according to claim 1, further comprising one or more compounds selected from a stabiliser, a dispersant, a surfactant, a preservative, a solvent, a thickening agent and a thixotropic agent.

8. The composition according to claim 1, further comprising one or more compounds selected from a water-repellent agent and a pigment.

9. The composition according to claim 8, comprising, as a water-repellent agent, products based on silicone, on silane, on siloxane or metallic salts of fatty acids.

10. The composition according to claim 8, comprising, as a pigment, one or more inorganic oxides or hydroxides.

11. The composition according to claim 8, comprising one or more pigments selected from the group consisting of titanium dioxide, iron, cobalt and chromium oxides.

12. A process for the preparation of a part moulded in hydraulic-setting material, comprising:

coating the sides of an appropriate mould with the composition according to claim 1;

introducing a freshly-prepared hydraulic-setting composition; and removing the part from the mould after hardening and optional curing of the composition.

13. The process according to claim 12, wherein the coating of the mould is done by spraying.

14. A moulded part obtainable by the process according to claim 12.

15. The moulded part according to claim 14, wherein the hydraulic-setting composition is a composition based on cement.

* * * * *